United States Patent [19]

Mazur et al.

[11] Patent Number: 4,853,040
[45] Date of Patent: Aug. 1, 1989

[54] PROCESSES FOR DECONTAMINATING POLLUTED SUBSTRATES

[75] Inventors: Duane J. Mazur, Amherst; Norman L. Weinberg, E. Amherst, both of N.Y.; Albert E. Abel, Columbus, Ohio

[73] Assignee: A. L. Sandpiper Corporation, Columbus, Ohio

[21] Appl. No.: 31,701

[22] Filed: Mar. 30, 1987

[51] Int. Cl.[4] .................. C10M 175/02; C10G 31/00; B08B 7/00
[52] U.S. Cl. .......................................... 134/2; 134/12; 134/42; 204/131; 208/179; 208/262.5; 210/909
[58] Field of Search ................. 208/179, 262; 210/909; 585/861; 134/12, 36, 42; 204/131, 149

[56] References Cited

U.S. PATENT DOCUMENTS

| | | | |
|---|---|---|---|
| 4,353,793 | 10/1982 | Brunelle | 208/262 |
| 4,377,471 | 3/1983 | Brown et al. | 208/262 |
| 4,430,208 | 2/1984 | Pytlewski et al. | 208/262 |
| 4,585,533 | 4/1986 | Habeeb | 204/131 |
| 4,632,742 | 12/1986 | Tundo | 210/909 |
| 4,639,309 | 1/1987 | Lalancette et al. | 208/262 |

OTHER PUBLICATIONS

Benkeser, R. A. et al, "The Selective Reduction of Aromatic Compounds to Dihydro or Tetrahydro Products by an Electrochemical Method", J. Am. Chem. Soc., vol. 86, 5272-5276 (1964).
Shevchuk, L. G. et al, Khimiya i Teknologiya Vody, vol. 4, No. 3, pp. 222-225, 1982.
H. O. House, Modern Synthetic Reactions, 2nd. Ed., W. A. Benjamin, Menlo Park, CA, Chapter 3, 145-150, 190-205, 1972.
Robert L. Augustine, Reduction, Marcel Dekker, Inc., New York, 95-170, 1968.

Primary Examiner—Patrick P. Garvin
Assistant Examiner—George R. Fourson
Attorney, Agent, or Firm—Howard M. Ellis

[57] ABSTRACT

Substrates polluted with toxic substances are treated at their location of contamination, in-situ with solvated electrons prepared chemically or electrochemically. The process is useful in detoxifying inert, non-reducible solvents contaminated with chemically reducible substances.

6 Claims, 1 Drawing Sheet

PROCESSES FOR DECONTAMINATING POLLUTED SUBSTRATES

BACKGROUND OF THE INVENTION

The present invention relates generally to processes for controlling environmental pollution, and more specifically, to chemical means for decontaminating substrates polluted with toxic substances.

The great difficulty in controlling toxic environmental pollutants is implied in the shear tonnage of the chemical industries production. Whereas 25 million gallons of benzene solvent were manufactured in 1940, by the 1980's, this figure exceeded 2 billion gallons per year in the United States alone. In the last twenty years the production of general organic solvents rose more than 900%, while during the same period the production of plastics increased by more than 2000%, and synthetic fibers, for example, more than doubled that figure.

Unfortunately, however, the technology for handling and disposing of toxic waste and chemical by-products has not kept pace with the enormous growth of industry and its requirements for chemicals. In response to this problem, a new industry, the hazardous waste disposal industry, developed. The new industry promised to neutralize or recycle wastes but no innovative technology to meet the growing problem economically developed. As a result, waste handlers have been forced to resort to land disposal, which is a storage technology and not a disposal technology, and only postpones the problem of ultimate disposal. In some instances, the toxic chemicals have been carelessly discharged into the environment, e.g. onto grounds or into landfills having inappropriate subsoils, and the like. For example, waste oils contaminated with dioxin, transformer oils containing polychlorinated biphenyls (PCB's), and a wide variety of waste solvents have been discharged, causing contamination of water supplies and creating other potential health risks.

Attempts to respond to leaking tank cars, spills and other environmental events and to decontaminate polluted grounds and other surfaces exposed to toxic substances frequently are met with delays and/or inadequate corrective measures. Often, time is of the essence to minimize environmental impact. Yet, cleanup can mean a relatively slow and costly process, e.g. removing the polluted substrates, such as by reclamation where, for instance, contaminated earth is excavated and transferred to a different location. Other methods of treating envorinmental events are either unreliable or not adequately spontaneous as to be amenable to on-site treatment of the exposed substrate. Accordingly, one aspect of the present invention provides for a more spontaneous process of decontaminating substrates which have become polluted with toxic substances by treating the subsrate at the situs of the event thereby reducing the potential for damage to the environment.

Numerous agricultural chemicals have recently been found to be potentially toxic or environmentally harmful. Agents such as pesticides, herbicides, fungicides, and fertilizers which are applied to large areas of ground in tonnage quantities are now being examined and in some cases banned for future use because of their toxicity. Materials such as DDT, chlordane, and chlordecone are now severely restricted. In high concentrations these materials pose a serious health threat as they leach into the aquifiers. Inexpensive, efficacious means for removing these materials from the soil or for destroying them in-situ do not presently exist. A further aspect of the present invention relates to an improved method for treating tonnage quantities of soil inexpensively with materials which are environmentally benign.

Halogenated compounds have a wide variety of practical applications, e.g. agriculture, horticulture, soil fumigants, solvents, to name but a few. Many of these materials are toxic to plant and animal life. Although some halogenated materials are photo-and/or biodegradable and eventually disappear from the environment, a substantial number and particularly the polyhalogenated organic compounds are stable and resistant to degradation. The presence of these materials in otherwise useful materials creates a double disposal problem, for not only must the toxin be disposed of, but also the material it contaminates, greatly increasing the overall volume of material requiring disposal. For instance, PCB's, once commonly used as transformer dielectric fluids, are a persistent source of contamination in replacement dielectric fluids. Several methods are presently being used for treating such contaminated chemically inert liquids. One such process generally referred to as the alkali metal or active metal process relies on heterogeneous reactions between solid sodium metal and halogenated organic materials in solution with mineral oil or other inert liquid. Processes of this type are hazardous because alkali metal can react violently with the halogenated contaminant. Furthermore, the process of destroying the toxic material is quite slow-because the heterogeneous reactions taking place require mass transfer of a solid phase material through the contaminated liquid phase. Accordingly, the present invention also contemplates an improved process for decontaminating/recycling chemically inert liquids, by a substantially spontaneous homogeneous reaction which destroys the toxic substance with a product of alkali metal while avoiding the direct use of such reactive metals per se as reducing agents in the process.

SUMMARY OF THE INVENTION

Generally, the present invention relates to processes for decontaminating substrates polluted with toxic or potentially hazardous substance, such as pesticides, insecticides, herbicides, various halogenated and non-halogenated organic compounds, other chemicals and their waste by-products; potentially harmful biological materials, etc., which can be chemically reduced, degraded or otherwise modified to simpler substances of lesser toxicity, and even more preferably, to substances which are essentially nontoxic.

One principal embodiment of the process includes the steps of providing a solution comprising solvated electrons and applying at the location of contamination, in-situ, by contacting the contaminated substrate with the solution in an amount sufficient to substantially decontaminate. Substantially decontaminate is intended to mean that the substrate has been effectively treated so that it may be recycled/returned to service for its intended purpose or disposed of without producing toxic effects to animal and plant life.

The process for decontamination can also include the steps of first forming a solution of the solvated electrons and contacting contaminated surfaces, for example, holding tanks or other chemical processing equipment having metallic, glass or other types of resistive surfaces with the solution in an amount sufficient to chemically reduce or otherwise detoxify the contaminated surfaces. This will have the effect of rendering the surfaces of the substrate safe for reuse.

Solutions comprising solvated electrons may be prepared chemically by dissolving an alkali metal, such as lithium, in liquid ammonia or other suitable nitrogen-containing solvent. Alternatively, solvated electrons can be prepared electrochemically by electrolyzing an alkali metal salt in liquid ammonia or other stabilizing solvent. The electrolyte containing the solvated electron can be applied, for instance, to the ground/earth at the site of the chemical spill to spontaneously detoxify the zone of contamination by significantly lowering the amount of toxic substance at the site.

Liquids polluted with toxic substances can also be decontaminated by the steps of providing a first liquid comprising solvated electrons, providing a second liquid polluted with a toxic substance, the second liquid comprising a chemically stable carrier contaminated with a chemically reactive toxic substance, mixing in a reaction zone the second liquid with a sufficient amount of the first liquid to chemically modify the toxic substance to a material of lesser toxicity without modifying the carrier, and recovering the carrier from the reaction zone.

These and other features and advantages will become more apparent from the following detailed description of the invention.

DESCRIPTION OF THE DRAWINGS

For a further understanding of the invention as well as its characterizing features, reference should now be made to the following detailed description thereof taken in conjunction with the accompanying drawing, wherein.

DETAILED DESCRIPTION OF THE INVENTION

Figure 1:
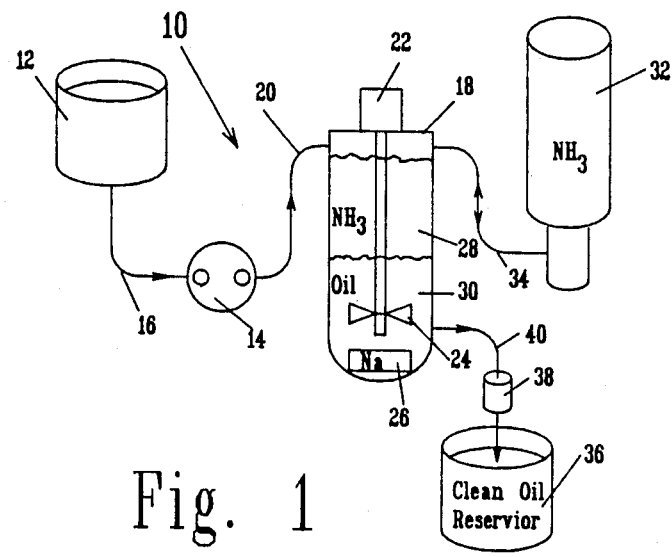
FIG. 1 is a diagrammatic view of one embodiment of the process employing solvated electrons to detoxify an inert, nonreducible liquid contaminated with a chemically reducible toxic substance.

The process of the present invention provides means for taking prompt remedial action to lessen the potential impact on the environment, particularly in consequence to exposure to toxic chemicals and biological materials. One embodiment of the invention includes the treatment of inert liquid carriers which have become contaminated, particularly with a chemically reducible organic compound; in-situ treatment of ground/earth, including discharges of toxic materials onto soils, clays, sand, stone and areas comprising mixtures of the same. The process can also be used for decontaminating metal substrates, such as holding vessels, tanks and chemical processing equipment; motor vehicles, buildings; textiles including clothing which may have become exposed to toxic chemicals and biologicals. In each instance the toxic substance should be capable of reacting in the presence of solvated electrons to form by-products having a lower potential for causing toxic effects in a biological system. For example, organic compounds, and more particularly, polyhalogenated aromatic compounds like polychlorinated biphenyls (PCB's) can be chemically reduced by contacting polluted soils or roadways to form relatively nontoxic biphenyls in-situ.

The process may be carried out by contacting polluted substrates, using methods like spraying, pouring or any other convenient means of applying solutions comprising the solvated electrons over e.g. a PCB-contaminated surface, or if a PCB-contaminated liquid is involved the liquid can be added to a solution of the solvated electrons and vigorously stirred. The reaction is substantially instantaneous. The solvent for the solvated electrons is then separated, such as by evaporation.

Solvated electrons can be generated chemically by dissolving an alkali metal, such as lithium, sodium or potassium, or select alkaline earth metals like calcium in a nitrogen-containing solvent, such as liquid ammonia cooled to from about −33° to about −50° C. A bright blue color indicative of the solvated electron is visible immediately. The reaction may be shown as follows:

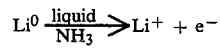

In solvating, molecules of the solvent around the charged species provide stability so that lithium ions, for example, do not react with solvated electrons. The liquid ammonia being a relatively non-reactive solvent is capable of solvating electrons giving them some useful life. The ammonia is preferably maintained at a temperature below its boiling point in order to slow down the reaction and prevent the formation of hydrogen as shown below:

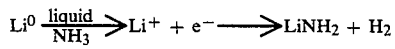

It should be understood, however, that solvated electrons can be formed at higher temperatures than −33° C. by maintaining the ammonia solution under positive pressure. The objective is to maintain the ammonia in a liquid phase. The treating solution should have solvated electrons in a concentration sufficient to decontaminate the substrate. Typically, this means an electron concentration of about 0.1 to about 2.0 molar. In each case, the amount of metal dissolved will be an amount which is needed to produce sufficient electrons to react, i.e. chemically reduce the contaminatant. For example, in the case of PCB's, it will require 2 electrons to reduce each chlorine to chloride.

In addition to liquid ammonia, other useful solvating solvents can be employed, such as primary amines, amides and ethers. Representative examples include alkyl amines, like methyl amine, ethyl amine; tetrahydrofuran (THF) and hexamethylphosphoamide. Dissolving metal reductions in the laboratory have been described by H.O. House in "Modern Synthetic Reactions", second edition, W. A. Benjamin, Menlo Park, Calif., Chapter 3, pages 145-150, 190-205, 1972.

Solvated electrons may also be generated electrochemically in an electrolytic cell comprising an anode side and a cathode side by electrolyzing an alkali metal salt, such as lithium bromide, sodium chloride, potassium bromide, etc., in liquid ammonia while maintaining the temperature from about −33° to −50° C. The electrolytic cell is equipped with a separator, such as a glass frit or porous PTFE materials. Catholyte comprising solvated electrons can be withdrawn and applied directly to the polluted substrate. The electrochemical generation of solvated electrons was described by R. A. Benkeser et al. J. Am. Chem. Soc., Vol. 86, 5272-76 (1964).

In addition to the treatment of substrates with solutions of solvated electrons by the direct in-situ application to soils and other polluated porous and nonporous surfaces, it was discovered, for example, that liquids which become polluted with toxic and other unwanted substances can also be decontaminated by treating with solvated electrons. For instance, transformer oils and other similar inert liquids which may become contaminated with polyhalogenated aromatic compounds can be decontaminated by means of solvated electrons causing the destruction of the pollutant, usually to levels of less than 1 ppm, as required by government environmental regulations. Because the solvated electrons chemically reduce on a selective basis only the pollutant, e.g. PCB's, the carrier liquid, e.g. transformer oil can be recovered and recycled for further use. Accordingly, the present invention has major economic advantages over other related processes.

One aspect of the invention thus contemplates embodiments where, for instance, inert liquids like hydrocarbon oils including transformer liquids, hydraulic fluids, other solvents and organic liquids like glycerin, THF, silicone based oils and other nonreactive materials which have become polluted can be treated by blending with solutions of solvated electrons and allowing the liquid ammonia to evaporate. The inert liquid can be recycled. This aspect of the invention can be practiced by vigorously stirring solutions comprising solvated electrons prepared either chemically or electrochemically. In addition, polluted inert liquids can be introduced into the catholyte compartment of a divided electrolytic cell wherein the solvated electrons generated at the cathode operate to chemically reduce the pollutant. The inert liquid can then be recovered.

Methods of the present invention can be demonstrated by reference to the drawing. FIG. 1 teaches a decontamination system 10 for treating chemically inert carriers polluted with chemically reactive toxic substances. Mineral or other paraffin oils contaminated with, e.g. PCG's, are collected in reservoir 12 and treated in pressurized vessel 18. However, before introducing the contaminated liquid into vessel 18 solvated electrons are first chemically generated in the vessel by charging with liquid ammonia from cylinder 32 at a somewhat elevated temperature, sufficient to dissolve sodium metal 26 and form a 1 to 2 molar solution of electrons. Motor 22 driving reactor stirrer 24 is actuated to disturb the protective oil layer on the sodium metal allowing the metal to dissolve in the ammonia and solvate the elecrons. Pump 14 then transfers contaminated oil from reservoir 12 to reactor vessel 18 through transfer lines 16 and 20. Oil temperature adjusting means of standard design (not shown) in line 20 in front of vessel 18 may be employed. The reaction mixture comprising the polluted oil and solvated electrons is stirred while allowing the temperature of the reaction mixture to rise above the boiling point of the solvent therein. Stirring is terminated and the mixture allowed to separate into an upper ammonia layer 28 and a lower oil layer 30. Ammonia 28 is bled off the reactor through line 34 to cylinder 32. Decontaminated oil 30 is drawn off through line 40, treated in in-line filter 38, and held for recycling in reservoir 36.

Figure 2:
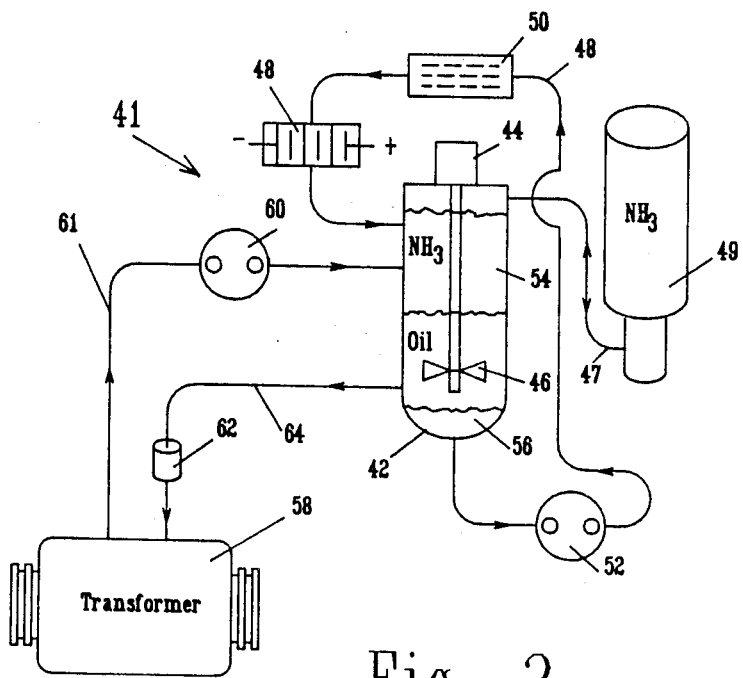
FIG. 2 is a diagrammatic view of an alternative embodiment of the process of employing solvated electrons generated electrochemically to detoxify a chemically inert liquid contaminated with a toxic substance.

FIG. 2 discloses a further embodment of the invention for in-line decontamination of PCB transformer oil, which like that of FIG. 1, not only decontaminates the carrier oil, but simultaneously destroys the toxic PCB's by chemical reduction using solvated electrons. Decontamination system 40 comprises a pressurized reactor vessel 42 equipped with a stirrer 46 driven by motor 44. Reactor vessel 42 is a component of ammonia loop 48, which includes liquid ammonia cylinder 49 connected to vessel 42 by likne 47 providing make-up ammonia to the loop. Pump 60 draws oil from transformer 58 to vessel 42 through direct oil outlet line 61. A solution comprising solvated electrons is formed outside the reactor vessel. In this regard, pump 52 bleeding ammonia from vessel 42 circulates the ammonia to chiller 50. The reliquified ammonia containing dissolved alkali metal salt, e.g. lithium bromide, is electrolyzed in a divided electrochemical cell 48. The catholyte containing solvated electrons is fed to reactor 42 where it is mixed with incoming transformer oil. The temperature of the reaction mixture is allowed to rise during mixing. Stirring is terminated and the mixture allowed to separate into a lower oil layer 56 and upper ammonia layer 54. Residual ammonia then returns to cylinder 49. The decontaminated oil is returned directly to the transformer from system 40 through oil inlet 64 after being treated in filter 62.

The following specific examples demonstrate various aspects of the invention, however, it is to be understood that these examples are for illustrative purposes only and do not purport to be wholly definitive as to conditions and scope.

EXAMPLE I

A 0.3 Molar solution of solvated electrons was prepared in a round bottom flask held in a cold bath of dry ice and acetone by stirring 0.35 grams of sodium in 50 ml of liquid ammonia at a temperature of $-45°$ C. The sodium metal quickly dissolved forming a characteristic blue solution. Twenty-five ml of transformer oil contaminated with 724 ppm of PCB's was then added to the 50 ml solution of solvated electrons in the liquid ammonia ($-45°$ C.) with vigorous stirring. The flask was then removed from the bath and allowed to gradually warm to room temperature over a two hour period, during which time the ammonia evaporated. The transformer oil in the flask was then analyzed by gas chromatography and found to have only 3 ppm PCB's present.

EXAMPLE II

In order to determine if chemical reduction was taking place at low temperatures, a 0.30 Molar solution of solvated electrons was prepared by stirring 0.175 grams of sodium in 25 ml of liquid ammonia ($-45°$ C.) in a flask held in a cold bath of dry ice and acetone. Twenty-five ml of transformer oil contaminated with 724 ppm of PCB's was added to the cold solution of solvated electrons with vigorous stirring. Stirring continued for 30 minutes while maintaining the solution at $-20°$ C. A sample of the contaminated oil was removed for analysis and found to have 364 ppm of PCB's present indicating that chemical reduction was occurring even at low temperatures.

EXAMPLE III

A sample of soil was contaminated with 273 ppm PCB's. In order to decontaminate the soil a 0.3 Molar solution of solvated electrons was prepared by dissolving 0.175 grams of sodium in 25 ml of liquid ammonia (−50° C.). The 25 ml of the 0.3 Molar solution at −50° C. was added to a 5.0 gram sample of the contaminated soil at room temperature. The ammonia evaporated instantly before penetration of the soil was complete, but analysis showed that the PCB concentration in the soil had still been reduced to 195 ppm.

EXAMPLE IV

A 500 ml volume glass laboratory electrolytic cell with a porous glass frit was set-up with a vitreous carbon cathode in the cathode compartment and a graphite anode in the anode compartment. The cell was held in a dry ice and acetone bath. The compartments were filled with 250 ml of liquid ammonia (−33° C.) having 10 grams of lithium bromide dissolved therein. Electrolysis was initiated, and 0.025 grams of the PCB's dissolved in 10 ml of cyclohexane was added to the catholyte. Electrolysis continued until 1,225 Coulombs of charge was passed at 0.4 amperes. The ammonia was then allowed to evaporate. The resulting solution was analyzed. 85% of the PCB's had been chemically reduced.

EXAMPLE V

A 50 ml solution of solvated electron in liquid ammonia was generated by dissolving 0.35 grams sodium metal with ammonia in a 250 ml round-bottom flask cooled to −50° C. The solution was poured over a 30 gram sample of sand (White Quartz, 50–70 mesh) having a PCB level of 236 ppm. The ammonia was allowed to evaporate over a 2 hour period, after which the sample appeared normal. The PCB level was reduced to 0.8 ppm.

EXAMPLE VI

A 50 ml solution of solvated electron in liquid ammonia (0.3 Molar) was generated by dissolving 0.035 grams of sodium metal in liquid ammonia in a 250 ml round-bottom flask cooled to −50° C. A 5 ml sample of tetrahydrofuran (THF) solvent contaminated with 1,450 ppm PCB's was added to the solvated electron, with stirring. The solution was allowed to warm to room temperature over a 2 hour period, after which the ammonia evaporated. The PCB level was reduced to 1 ppm.

While the invention has been described in conjunction with specific examples thereof, this is illustrative only. Accordingly, many alternatives, modifications and variations will be apparent to persons skilled in the art in light of the foregoing description, and it is therefore intended to embrace all such alternatives, modifications and variations as to fall within the spirit and broad scope of the appended claims.

What is claimed is:

1. A process for decontaminating a substrate polluted with a toxic substance, which comprises the steps of generating solvated electrons electrochemically in an electrolytic cell comprising an anode side and a cathode side by electrolyzing an alkali metal salt in a solvent selected from the group consisting of liquid ammonia, a primary amine, an amide and mixtures thereof; withdrawing the resulting solution comprising the solvated electrons from the cathode side of the electrolytic cell, and chemically reducing the toxic substance by applying said solution in-situ to said polluted substrate in an amount sufficient to substantially decontaminate the substrate.

2. The process of claim 1 wherein the alkali metal salt is a lithium halide salt and the solvent is liquid ammonia.

3. The process of claim 1 wherein the solution comprising the solvated electrons is a first liquid and the polluted substrate is a second liquid comprising a chemically stable, nonreactive carrier contaminated with a chemically reactive toxic substance, said process including the step of forming said first liquid by electrolyzing a solution comprising liquid ammonia and an alkali metal salt, and mixing in a reaction zone said second liquid with a sufficient amount of said first liquid to chemically modify the toxic substance to a material of lesser toxicity without chemically modifying said carrier, and recovering said carrier from said reaction zone substantially decontaminated.

4. The process of claim 3 wherein the second liquid comprises a transformer fluid contaminated with a chemically reducible polyhalogenated aromatic compound.

5. The process of claim 4 including the step of recovering the liquid ammonia from the reaction zone for recycling to the electrolytic cell.

6. The process of claim 3 wherein the electrolytic cell is divided into catholyte and anloyte compartments in which the catholyte compartment comprising solvated electrons is the reaction zone, said process including the step of adding the contaminated second liquid to the catholyte compartment for chemical reduction of the toxic substance therein and subsequently removing the carrier therefrom in a substantially decontaminated form.

* * * * *